Patented Apr. 26, 1949

2,468,414

UNITED STATES PATENT OFFICE 2,468,414

HYDROGENATED HYDROCARBON RESIN AND RESIN COMPOSITIONS

Frank J. Soday, Baton Rouge, La., assignor to The United Gas Improvement Company, a corporation of Pennsylvania No Drawing. Application June 20, 1944, Serial No. 541,262

1 Claim. (Cl. 260—45.5)

The present invention relates to a novel type of hydrogenated hydrocarbon resin.

More particularly, this invention relates to the hydrogenation of a resin derived by polymerization, by thermal and/or catalytic methods, of certain high boiling monomeric material separated in monomeric form from tar formed during the production of combustible gas by processes involving the pyrolytic decomposition of petroleum oil with or without the aid of catalysts.

A principal object of the present invention is the provision of a novel hydrogenated hydrocarbon resin having wide applicability in many fields.

A further object of the invention is the provision of an hydrogenated hydrocarbon resin which may be used, either alone or in admixture with other ingredients, for coating and/or impregnating a variety of surfaces and/or materials, including fibrous materials.

Other objects, including the provision of a simple and economical method of producing hydrogenated resins of the stated type, will be apparent from a consideration of the specification and claims.

This invention is concerned with the preparation of hydrogenated hydrocarbon resins from petroleum oil gas tar resins of the type described herein.

The resin obtained by the thermal and/or catalytic polymerization of unsaturated monomeric material boiling within the range of from 210° to 450° C., and particularly from 210° C. to 350° C., and separated in monomeric form from higher boiling pitch constituents of the tar formed during the production of gas by processes involving the pyrolytic decomposition of petroleum oil, with or without the aid of catalysts, may have its field of usefulness largely increased by partial or complete hydrogenation.

The hydrocarbon constituents of such petroleum tar have usually been considered to comprise residual tar, dead oil, and light oil. The residual tar comprises the heavy black pitch constitutents of the tar together with any oil unseparated therefrom. The dead oil comprises oil separated from the residual tar and boiling higher than say 200–210° C. The light oil comprises oil separated from residual tar and boiling lower than say 200–210° C.

It has been discovered that very considerable quantities of such resin forming unsaturated monomeric material above referred to, including large quantities of readily heat polymerizable material, may be contained in the tar produced in the vapor phase pyrolysis of crude petroleum oil or a fraction or fractions thereof such as for example gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and also particularly so when the oil pyrolyzed is naphthenic, such as a crude oil classifiable in classes 5 to 7 inclusive, according to the method of classification described in Bureau of Mines Bulletin 291 as modified by Bureau of Mines Report of Investigation 3279, or a fraction or fractions of such an oil.

The possibility of recovering large quantities of resin forming monomeric unsaturated material boiling in the dead oil range was long unrealized. This was because the usual distillation procedures for the purpose of petroleum tar dehydration and/or tar fractionation were such as to polymerize the readily heat polymerizable monomers boiling in the dead oil range into heavy polymers, which were inextricably mixed with the heavy black residual pitch constituents and lost therein.

In copending application Serial Number 370,608, filed December 18, 1940, by Edwin L. Hall and Howard R. Batchelder, which has matured into Patent 2,387,259, granted October 23, 1945, such heat polymerizable monomeric hydrocarbons boiling in the range of from 210 to 450° C. and separated from the heavy black pitch constituents of the petroleum tar are described and claimed, together with heat polymers produced therefrom.

In copending application 386,232, filed April 1, 1941, by Waldo C. Ault, which has matured into Patent 2,387,237, granted October 23, 1945, there is described and claimed the production of catalytic resins from the heat polymerizable and/or catalytically polymerizable monomeric hydrocarbons boiling within the range of from 210° C. to 450° C. and separated in monomeric form from the heavy black pitch constituents of the petroleum tar.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, which has matured into Patent 2,366,899, granted January 9, 1945, there is described a method of dehydrating such petroleum tar emulsions and of fractionating the hydrocarbon constituents thereof by rapid distillation with the separation from the heavy pitch constituents of residual tar of such heat polymerizable unsaturated monomeric hydrocarbons boiling in the dead oil range.

In copending application 353,034, filed August 17, 1940, by Howard R. Batchelder, which has matured into Patent 2,383,362, granted August 21, 1945, there is described the dehydration of such petroleum tar emulsions and the fractionation of the hydrocarbon constituents thereof with the recovery of monomeric unsaturated heat polymerizable dead oil constituents separate from the heavy black pitch constituents of residual tar, by the solvent extraction of the emulsion with a hydrocarbon solvent such as liquefied propane or butane.

Other processes, for example fractional condensation, might be employed to recover these relatively high boiling unsaturated hydrocarbons in monomeric form and separate from the heavy black pitch constituents of the tar. Also processes for oil pyrolysis which avoid the formation of emulsions, may be employed for the production of the monomeric material. Furthermore, while it may be preferred to employ petroleum oils or cuts therefrom, which are classifiable in classes 5 to 7 inclusive according to Bureau of Mines Bulletin 291 and particularly in class 7, modified as indicated above, other oils may be employed.

Whatever process of oil pyrolysis is employed in the production of this monomeric material and whatever process is employed for separating the resultant tar, a very important factor is the exercise of care in the treatment of the tar in order to avoid excessive polymerization of these readily heat polymerizable dead oil constituents and their loss as polymers mixed with the heavy black pitch constituents of the residual tar.

As a result of separation of the light oil and dead oil components of the products of such petroleum oil pyrolysis from the residual tar, without polymerization or with materially reduced polymerization, a substantially pitch-free hydrocarbon material may be separated having a portion boiling within the range of from 210° to 450° C. and particularly within the range from 210° C. to 350° C., which may contain from 5% to 30%, and higher, of monomeric unsaturated hydrocarbons readily polymerizable by heat.

The particular concentration of this heat polymerizable monomeric material obtained in a given case will depend upon the amount of polymerization produced in separating it from the residual tar, as well as upon such factors as the conditions of pyrolysis and the character of the petroleum oil pyrolyzed.

As previously stated, the above mentioned heat polymerizable monomeric material may be readily polymerized by heat to form valuable resins.

Polymerization may be effected by heating the total material separated from the residual tar sufficiently to polymerize the readily heat polymerizable monomers boiling within the range of from 210° to 450° C., but insufficiently to appreciably polymerize the heat polymerizable material contained in lower boiling ranges, such, for instance, as styrene and methyl styrene. This may be accomplished, for example, by heating with stirring for 4 hours at 200° C. followed by distillation under vacuum to isolate the resin.

It may be preferable, however, to first effect a separation by fractional distillation between light oil boiling below say 210° C. and dead oil boiling above say 210° C.

The heat polymerizable monomeric material boiling within the range of 210° to 450° C. is so readily polymerizable by heat, that, in the fractional distillation of the light oil from the dead oil, a portion of the monomeric material is usually unavoidably polymerized and remains as polymer dissolved in the other constituents of the dead oil after the light oil is taken off overhead.

The polymerization of the heat polymerizable unsaturated monomeric material in the separated dead oil may be effected by heating the dead oil with stirring, for example, for four hours at 200° C.

The resin thus produced, together with any resin produced during the separation of the light oil from the dead oil, may then be isolated by distillation under vacuum.

In the separation of lower boiling hydrocarbon material from the pitch constituents of residual tar by various methods, the oil separated may contain components boiling above 350° C. and there may be present heat polymerizable monomeric material boiling outside the range of from 210° and 450° C. together with the monomeric material boiling within that range. On polymerization therefore the resin may include polymers derived from monomers boiling outside the said range along with polymers derived from monomers boiling within the said range.

As hereinbefore stated, after polymerization the resin may be isolated by distillation in vacuum, which may be assisted by steam. The yield, melting point, and other characteristics of the resin will depend upon the extent to which the isolation has been carried, or, in other words, upon the proportion of associated oils left in the resin.

Exhaustive steam distillations of the resins obtained from the unsaturated monomeric material isolated from tar by the distillation or solvent extraction methods described herein have produced resins having melting points as high as from 185° C. to 200° C. and higher, cube in mercury, as determined by the method and apparatus described in A. S. T. M. Procedure D61–24, with the following modifications.

1. Mercury is employed in depth of 2½ inches instead of water.

2. The cube of resin is rigidly supported by clamping the hook upon which the resin is attached so that the top of the cube is 1 inch below the surface of the mercury.

3. A 1½ inch immersion thermometer is employed and is immersed to that depth.

4. The exact temperature at which the resin becomes visible at the surface of the mercury is recorded as the softening point of the resin.

5. The melting point of the resin is calculated from the softening point by the following formula, Melting Point °C. = Softening Point °C. × 1.25 + 2° C.

The melting point of the resins described in this specification is intended to mean melting point as determined by the above recited method, unless otherwise specified.

Lower melting point resins may be readily obtained in greater yields by less exhaustive removal of the associated oils, thus resins ranging from very soft to hard resins having high melting points may be obtained as desired.

It has been usually found that each 6% of associated oils left in the resin lowers the melting point about 10° C.

Heat resins having melting points of 120° C. have been readily produced in yields corresponding to 20 to 30% of the dead oil in the case of the tar distillate produced in accordance with the process described in copending application Serial No. 342,735 and resins of the same melting point have been obtained in yields as high as 60% of the dead oil in the case of dead oil separated from extract produced in the process described in application Serial No. 353,034.

The heat polymerizable unsaturated monomeric material is preferably in sufficient concentration in that portion of the hydrocarbon material separated from the residual tar which boils within the range of from 210° to 450° C. to produce on polymerization by heat a 120° C. melting-point resin in quantity equal to at least 10 percent of the hydrocarbon material boiling within the range from 210° C. to 450° C., and preferably at least 20 percent, or higher, but lower concentrations may be employed.

The color of the resins obtained may vary from yellow to dark brown.

Heat polymer resins produced from dead oil separated from residual tar by the distillation process described in said copending application, Serial No. 342,735, have shown a tendency to be lighter in color than those produced from dead oil obtained from the solvent extraction of tar with propane and butane as described in said copending application, Serial No. 353,034. Also, heat polymer resins produced from the lower boiling portions of the dead oil have shown a tendency to be lighter in color than heat polymer resins produced from the higher boiling portions, especially such a portion as that boiling in a dead oil cut taken from 180° C. to 210° C. under a vacuum equivalent to 20 mm. of mercury, absolute.

The following examples will serve to illustrate the preparation of resins from such unsaturated fractions by thermal polymerization methods.

*Example 1*

Approximately 1000 grams of dead oil derived from the rapid distillation of oil gas tar in accordance with the process described in said copending application, Serial No. 342,735, and subsequent separation of the distillate, was weighed into a 2-liter 3-necked flask equipped with a thermometer and a short reflux condenser. The oil was then slowly stirred and heated over a Bunsen burner at a liquid temperature of 200° C. (±10° C.) for a period of 4 hours.

At the conclusion of this period, the material was allowed to cool somewhat and was then transferred for distillation to a tared 2-liter flask equipped with a ground glass neck. The oil was accurately weighed at this point.

The flask was provided with means for measuring vapor temperatures, in addition to a condensing apparatus and means for providing a vacuum. Bumping during distillation was avoided by folding several folds of iron wire to such length that one end reached slightly into the neck of the flask while the other end rested on the bottom the flask.

The pressure was reduced to 100 mm. Hg, absolute, and heat applied by means of a Bunsen burner. The distillation was continued at a pressure of 100 mm. Hg, absolute, until the vapor temperature reached 180° C. During this first stage of the distillation, care should be exercised to prevent crystallization of naphthalene, if present, such as by employing a condenser operating at elevated temperatures.

When the vapor temperature reached 180° C. at a pressure of 100 mm. Hg, absolute, the flame was lowered and the pressure gradually reduced to 20 mm. Hg, absolute, using care to avoid bumping. When a pressure equivalent to 20 mm. Hg, absolute, was reached, the pressure was maintained at that value, and the distillation continued until a vapor temperature of 195° C. was reached.

During the second stage, the condenser may be cooled by cold water, but care should be taken to avoid the solidification of anthracene, if present.

The distillation was conducted rapidly, 5 to 10 cc. of oil per minute being removed.

When a vapor temperature of 195° C. was reached, the source of heat was removed and air was permitted to enter the apparatus slowly until atmospheric balance was restored.

In the above operation the yield of resin was 29.3% with an actual melting point of 128° C., which was calculated to be equivalent to a yield of 31.4% at a melting point of 120° C. The color of the resin was light brown.

A straight run A. S. T. M. distillation of 100 cc. of the original oil gave the following data:

| | | |
|---|---|---|
| First drop | °C | 194 |
| 5 cc | °C | 212 |
| 10 cc | °C | 223 |
| 20 cc | °C | 234.5 |
| 30 cc | °C | 242.5 |
| 50 cc | °C | 256.5 |
| 70 cc | °C | 283.0 |
| 90 cc | °C | 319.0 |
| Decomposition point | °C | 319.0 |
| Total distillate | cc | 87 |
| Density at 20° C | | 1.0107 |

As pointed out previously, the high boiling monomeric material derived from tar obtained in the pyrolysis of petroleum, by rapid distillation or solvent extraction methods may be polymerized to form resins of the type desired by the application of certain catalysts, either with or without the simultaneous, or otherwise, application of heat.

Catalysts such as mineral acids, for example, sulfuric acid, hydrogen chloride, and acids of phosphorus, or acid-acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid-acting metallic halides.

Though acid-acting catalysts are preferred, other catalysts may be employed if desired such, for example, as catalysts of the neutral surface type. Examples of such catalysts are activated clays, silica gel, activated carbon, and the like.

As an example of a convenient procedure for the production of resins of the type desired with the use of sulfuric acid as a catalyst, the following is given.

Example 2

A sample of the oil to be polymerized, say 500 cc. is poured into a two-liter 3-neck flask equipped with a thermometer and stirrer. To the oil is added 96% $H_2SO_4$ while agitating vigorously. The acid is added 1 cc. at a time and the temperature is not permitted to exceed 50° C. The addition of the acid is continued in this manner until no further temperature rise is noted. The amount of acid necessary to achieve this end has been found to be about 1%, by volume, of the oil present.

The oil then is diluted with approximately an equal volume of naphtha, toluene, or similar diluent, and the solution decanted into 500 cc. of warm water (approximately 60° C.), leaving the acid sludge behind.

After settling, the water layer is drawn off, and neutralization of the acid is accomplished by use of a 10% to 20% aqueous solution of sodium hydroxide. After washing with caustic, an additional water wash may be made. In either case, the resin solution is dried by filtration through a bed of a suitable drying agent, such as lime.

If desired, the diluent may be added before polymerization instead of after polymerization.

After neutralization and drying, the resin may be isolated from the unpolymerized oil by any desired method, or the resin may be concentrated therein by vacuum distillation, which may be assisted by steam. The melting point of the resin and the yield obtained will depend, among other things, upon the extent to which the resin has been removed from the unpolymerized oil.

A convenient procedure for the production of resins of the type desired by the polymerization of monomeric unsaturated material, derived from tar resulting from the pyrolysis of petroleum, with the use of metallic halide catalysts or metallic halide-organic solvent complex catalysts is illustrated in the following examples.

Example 3

A 10 gram portion of the selected catalyst is suspended in 300 cc. of benzene by stirring. A 300 cc. portion of the dead oil separated from distillate recovered from petroleum tar emulsion by flash distillation as described in said copending application, Serial No. 342,735, is added dropwise from a separatory funnel while maintaining the temperature of the reaction mass below 50° C. When the addition has been completed, the mass is stirred for a period of 2 hours and then neutralized with an aqueous solution of sodium hydroxide (10 to 20%). Stirring is continued for an additional hour.

Clay or any other desired filter aid then is added and the mass is filtered. The aqueous layer is separated and discarded, after which the treated material is washed with hot water until the washings are neutral to litmus. The treated material then is filtered through lime to remove water or otherwise dried, and the resin isolated by any desired method.

The unsaturated dead oil employed in the following example was extracted from petroleum tar emulsion, along with light oil, following the procedure described in copending application Serial Number 353,034. After separation of the light oil, the unsaturated dead oil was treated in the following manner.

Example 4

A 532.6 gram portion of this unsaturated dead oil was treated with 8 cc. of 66° Bé. $H_2SO_4$ according to the procedure described in Example 2. Toluene was added after polymerization. Approximately 42% of the dead oil was converted to resin having a melting point of 97° C. and a brown color. The end temperature of the distillation for the removal of oil from the resin was 192° C. and the end pressure was equivalent to 18 mm. of mercury, absolute. A total of 145.9 grams of oil was recovered. The calculated yield of resin having a melting point of 120° C. was 36.2%.

As pointed out previously, the unsaturated dead oil employed for the preparation of resins of the type desired may be polymerized by (a) thermal means, (b) catalytic means, or (c) a combination of thermal and catalytic means. In the latter case, the processes may be carried out consecutively without the intermediate removal of resin, or the resin may be removed between successive treatments.

The unsaturated dead oil used in the following example was obtained from petroleum tar emulsion by the process of copending application Serial Number 342,735. After separation from light oil, it was treated to remove heat polymerizable unsaturates by heating at 200° C. for 4 hours, followed by removal of the heat polymer resin formed. It was then subjected to catalytic polymerization by the following method.

Example 5

A 500 gram portion of the said unsaturated dead oil was treated with 6 cc. of 66° Bé. $H_2SO_4$ according to the method described in Example 2. Naphtha was added after polymerization. Approximately 19% of the dead oil was converted to resin having a melting point of 88.2° C. and a light yellow brown color. The end temperature of the distillation for the removal of oil from the resin was 185° C., and the end pressure was equivalent to 20 mm. of mercury, absolute. A total of 407.9 grams of oil was recovered. The calculated yield of resin having a melting point of 120° C. was approximately 15%.

Examination of the monomeric unsaturated material and associated oil boiling within the range of from 210 to 450° C. described herein and the resins produced therefrom have shown that these materials are predominately aromatic.

Density determinations have indicated that the density at 25° C. of the resins obtained as described herein frequently falls within the approximate range of 1.12 to 1.20, with resins produced from dead oil from the solvent extraction of tar tending to be somewhat higher than those produced from dead oil from rapid tar distillation. The densities of the acid polymers tend to be somewhat lower than those of the heat polymers derived from the same unsaturated dead oil. Resins of this type having other densities may be employed, however.

The molecular weights of the resins produced as previously described necessarily vary with the melting point, which also varies with the presence of varying quantities of associated oil among other factors. Determinations by the benzene freezing point depression method have shown that such resins usually have molecular weights ranging from 308 to 758 over a range of melting points from 80.5° C. to 195° C. as determined by the cube in mercury method.

The fracture of the high melting point resins described herein may range from conchoidal to hackly. In general, the polymers are quite brittle.

The resins described herein, except those hardened by exhaustive steam distillation to a very high melting point, will usually react positively to the anthraquinone reaction, indicating the presence of anthracene, unless produced from lower boiling portions of the dead oil, which do not contain anthracene, or unless the anthracene has been otherwise removed.

The resins described herein usually will give but a slight diazo reaction, indicating the substantial absence of phenols.

The resins produced as above described usually will give negative Lieberman Storch reactions, indicating the absence of rosin acids.

Upon thermal decomposition of the resins of the type produced as above described herein, appreciable yields of material boiling within the range from 210° to 450° C. will be produced.

The heat polymer resins of the type produced as described herein usually are substantially completely soluable in carbon disulfide and benzol. The quantity of resin insoluble in a mixture containing 50% petroleum ether and 50% pentane varies with the melting point of the resin, and may be of the order of 52% in the case of a thermal resin having a melting point of 95° C. and of the order of 80% in the case of a thermal resin having a melting point of approximately 183° C. (Cube in mercury method).

The quantity of resin of the type produced as described herein insoluble in a mixture of 50% petroleum ether and 50% pentane, but soluble in $CCl_4$ may be of the order of 50% for a thermal resin having a melting point of 95° C. and of the order of 75% in the case of a thermal resin having a melting point of 183° C. (Cube in mercury method.)

The quantity of thermal resin insoluble in both the petroleum ether-pentane solution and $CCl_4$ usually is very low, ranging from a fraction of a per cent to the neighborhood of 6 or 7%.

In general, catalytic polymers are much more soluble than heat polymers from the same unsaturated dead oil in all solvents except the alcohols.

The polymers from unsaturated dead oils obtained from the rapid distillation process described in copending application, Serial No. 342,735, tend to be more soluble in those solvents tried than similarly produced polymers from unsaturated dead oils obtained by the solvent extraction process described in copending application, Serial No. 353,034.

The free carbon content of resins of the type described usually is less than 5% and frequently less than 1%, or even 0.5%.

The above described characteristics of color, density, fracture, melting point, molecular weight, diazo reaction, Lieberman Storch reaction, anthraquinone reaction, thermal decomposition, and solubility are given for the purpose of illustration. It is not intended to imploy necessarily that the resin produced as described above and employed herein may not depart somewhat from this illustrative description in one particular or more.

Furthermore, the addition of other materials to the heat polymerizable monomeric unsaturated materials prior to polymerization or to the resins after polymerization may, of course, modify the properties of the resins produced. Examples of such materials are other synthetic or natural resins, plasticizers, softeners, fillers, coloring materials, etc.

The resin employed may comprise mixed polymers of monomeric material boiling within the range of from 210° C. to 450° C. together if desired with polymers of monomers boiling outside of this range or resins may be employed which are produced from monomers boiling within a selected range or ranges within the range of from 210° C. to 450° C., for instance, from separated material boiling above say 250° C., or say above 280° C.

The extracted oils may, for example, be distilled prior to distillation to give a high boiling fraction and a low boiling fraction, which may be polymerized separately.

In separating such material, the dead oil containing the monomers may be fractionated by distillation under vacuum assisted by steam to avoid undue polymerization during the separation, or other methods of separation may be employed.

The resins of the type described herein, generally speaking, are inert in character, and are resistant to attack by moisture and possess excellent dielectric properties.

The physical and chemical characteristics of such resins may be measurably altered, and their color greatly improved by subjecting said resins to partial or complete hydrogenation.

In carrying out the hydrogenation of resins of the type described a solution of the polymer in a solvent is preferably employed. Examples of solvents are benzene, toluene, xylene, and solvent naphtha.

Highly satisfactory results may be obtained by employing a solution of the polymer in a hydrogenated solvent, examples of which are decahydronaphthalene and hexahydrobenzene. The especial suitability of the hydrogenated solvents is perhaps in some way associated with their capacity of absorbing hydrogen or of forming a loose complex or addition compound with hydrogen. The absorbed or loosely held hydrogen is apparently subsequently transferred to the resin molecule.

To effect the hydrogenation a catalyst is preferably employed.

Materials selected from groups VI and VIII of the periodic table are, in general, satisfactory for this purpose.

Examples of such catalysts are nickel and platinum, of which I prefer to employ finely divided nickel, such as, Raney nickel.

Derivatives of such metals may also be employed, an example of which is nickel oxide.

Metals selected from other groups of the periodic table are also effective in catalyzing the reaction. An example of such metals is copper.

Other catalysts may be employed, such as the chromites of copper, zinc and nickel. Activated clay is also suitable.

With respect to the activity of the particular catalyst selected, generally speaking, in the production of the catalyst, methods designed to increase the ratio of surface per unit of mass lead to a corresponding increase in the activity of the catalyst.

Although the hydrogenation may be carried out at atmospheric pressure, superatmospheric pressures are preferably employed since the degree of hydrogenation in a given time is, in general, a function of the pressure. As an example, pressures ranging from 100 to 10,000 pounds per square inch are suitable. Excellent results have been obtained through the use of various pressures ranging from 300 to 1500 pounds per square inch.

Hydrogenation at temperatures below 200° C. is preferred, although temperatures in the neighborhood of 200° C. or higher, might be employed for instance, for shorter periods of time. Temperatures between 25 and 150° C. are satisfactory, while excellent results are secured by employing temperatures between 25 and 100° C.

Any suitable quantity of catalyst may be employed, such as, between 2% and 50% by weight and more preferably between 5% and 25% by weight based on the material treated.

The time during which the material under treatment is subjected to hydrogenation is, of course, subject to wide variation depending upon the degree of hydrogenation desired.

Generally speaking, and with all other conditions the same, an increase in time will result in an increase in the degree of hydrogenation. However, the rate of hydrogenation decreases with increase in degree of hydrogenation.

Hydrogen is absorbed very rapidly during the initial stages of the hydrogenation, and after a short time the rate of hydrogen absorption falls off rapidly until a more or less constant rate is reached. This indicates that certain of the double bonds present, presumably the terminal double bonds, are rapidly hydrogenated and that the double bond or bonds in the interior of the polymer molecule are much less active.

The following examples will serve to further illustrate the invention.

Example 6

A 1000 cc. portion of a solution of the resin prepared as in Example 1 in decahydronaphthalene, containing 10% of the polymer, is placed in an autoclave lined with stainless steel and equipped with an agitator.

25 grams of nickel catalyst is added, after which the autoclave is closed. Hydrogen is introduced and held at a pressure of 300 pounds per square inch for 24 hours, during which time the contents of the autoclave are subjected to agitation.

After the removal of catalyst by filtration, a solution of hydrogenated resin of the type described is obtained.

After removing the solvent, a resin having a much lighter color than the original resin is obtained. By continuing the hydrogenation for a longer period of time, particularly in conjunction with the addition of additional quantities of catalyst, a resin possessing almost any degree of color reduction may be obtained.

The degree of hydrogenation desired can be controlled within very narrow limits by a choice of operating conditions, such as concentration of resin, the method of polymerization used in preparing the resin, the nature of the solvent employed, the type and quantity of catalyst used, the temperature and pressure employed, and the time employed.

The color of the resin obtained may be controlled at will by controlling the extent of hydrogenation. In general, the color of the resin becomes lighter with increasing extent of hydrogenation. The light colored resins thus obtained are very suitable for use in coating compositions.

The manner in which the resin is produced in a measure effects the ease of hydrogenation in that resins made with the halide type of catalyst such as the metallic halides, with metallic halide-organic solvent complexes, or with mineral acids, is more difficultly hydrogenated than resin made with halide-free or sulfur-free, catalysts, such as activated clay. The resin prepared by the thermal polymerization of aromatic oils of the type described is greatly preferred for hydrogenation purposes.

Since metallic catalysts are readily poisoned by substances, such as thiophene, sulfur, arsenic, mercury, phosphorous, chlorine, bromine, iodine, lime, potassium hydroxide, selenium, glycerine, cyanides, and certain organic acids, care should be taken to avoid the presence of materials of this character during the hydrogenation step. Accordingly, benzene containing any substantial quantity of thiophene or sulfur is preferably avoided.

The starting material should also preferably be free from such substances.

However, catalyst poisons might be removed from solutions of the starting material in a number of ways of which the following are examples.

Finely divided metal or other active material, such as charcoal is added to the resin solution with thorough agitation. The impurities are adsorbed by the active material which is then removed by filtration.

Another way of removing catalyst poisons involves the percolation of the solution through a bed of finely divided metal or other active material followed by clarification.

On the other hand, the action of any catalyst poison may be retarded by adding the catalyst in several successive portions to the material undergoing hydrogenation instead of all at once which is the customary procedure.

The hydrogenated resins of the type described are particularly desirable for use in coating compositions because of their light color and excellent alkali and water resistance. Typical coating compositions are those containing bodied drying oils, such as linseed, tung, perila, oiticica, fish oils, dehydrated castor oil, isomerized linseed oil, and the like. Short oil varishes, particularly those having an oil length of less than 25 gallons are preferred. As is well known in the art, an oil length of less than twenty-five gallons means the presence in the varnish of less than twenty-five gallons of oil per 100 pounds of resin. A varnish of this type is as follows:

Example 7

A mixtures of the hydrogenated resin and linseed oil is heated to a temperature of 580° F., after which is is held at this temperature until the desired body is attained. The varnish then is reduced to 50% solids by the addition of Sunoco Spirits.

A quantity of cobalt and lead napthenates equivalent to 0.6% lead and 0.2 cobalt, expressed in terms of the respective metals as a percentage of the drying oil present, is added to the varnish when it reaches room temperature.

The varnish has excellent coating properties.

A preferred embodiment of the invention is the use of hydrogenated resins of the type described as softening and tackifying agents for natural and synthetic rubber. The absence, or substantial absence, of reactive double bonds in such hydrogenated resins results in a material which does not interfere with the subsequent curing processes.

As pointed out previously, hydrogenated resins of the type described herein are excellent plasticizing, tackifying and/or softening agents for natural, and particularly synthetic rubber.

Examples of the rubber or rubber-like materials with which hydrogenated resins of the type described herein may be compounded are the various grades and types of natural rubber and rubber-like materials, and synthetic rubbers or elastomers, such as, for example, those obtained by the polymerization of one or more diolefines, or substituents thereof, such as butadiene, isoprene, piperylene, 2-chlorobutadiene, and the like, either alone, or in admixture, or in combination with one or more unsaturated and/or reactive compounds or materials such as olefines, unsaturated nitriles, acids, esters, ethers, ketones, aldehydes, and/or substituents thereof, such as, for example, styrene, acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines. These materials are known in the art under different trade names, such as, for example, Buna, Buna S, Buna N, Perbunan, Chloroprene, neoprene, Ameripol, Hycar, Butyl rubber, and the like.

Synthetic rubbers of the type obtained by the reaction of dihalides with organic or inorganic sulfides or polysulfides also are included, such as for example, the material prepared by the reaction of ethylene dichloride with sodium tetrasulfide and sold under the trade name, Thiokol.

The quantity of hydrogenated resins of the type described herein which may be incorporated in natural or synthetic rubbers, or elastomers, may be varied over very wide limits, depending upon the properties desired. Thus, for example, quantities varying from a few percent, or less, to an amount equal to, or greater than, the quantity of rubber, or rubber mixture, employed in the composition, may be used.

I prefer to use from 2% to 50% and more particularly from 5% to 30% by weight of hydrogenated resin based on the weight of the rubber.

In addition to hydrogenated resins of the type described herein, other ingredients which may be incorporated in natural rubber and/or synthetic rubber compositions include vulcanizing agents and/or accelerators, such as, for example, sulfur or sulfur-containing compounds such as tetramethylthiuram disulfide mercaptoarylenethiazoles, such as mercaptobenzothiazole, benzothiazyl disulfide, litharge, and dithio carbamates; pigments, such as, for example, magnesium oxide, zinc oxide, and lead oxide; antioxidants, such as, for example phenyl-alpha-naphthylamine (Neozone A), and phenyl-beta-naphthylamine (Neozone D); reinforcing pigments, such as, for example, carbon blacks, such as channel black, clay, and blanc fixe; fillers and/or diluents, such as, for example, lithopone, barytes, whiting, and asbestine; other softeners and plasticizing agents such as, for example, paraffin wax, factice, dibutyl phthalate, tricresyl phosphate, pine oil, oils, fatty acids, and synthetic or natural resins or resinous materials.

Reclaimed rubber is also included among the materials which may be plasticized with the hydrogenated resin herein described, together with natural and/or synthetic rubber, and with or without other ingredients.

The hydrogenated resins of the type described, and other ingredients, may be mixed or compounded with the natural rubber and/or synthetic rubber on mixing or compounding rolls or mills, or they may be compounded by any other method known in the art. The rubber composition then may be vulcanized, if desired, by any of the methods employed for this purpose in the art.

Examples of rubber compositions containing hydrogenated resins of the type described herein are as follows:

Example 8

| Component: | Parts by weight |
|---|---|
| Natural rubber | 100 |
| Hydrogenated resin of the type described | 10 |
| Zinc oxide | 5 |
| Sulfur | 2.5 |
| Mercaptobenzothiazole | 0.6 |

Example 9

| Component: | Parts by weight |
|---|---|
| Pale crepe rubber | 100 |
| Zinc oxide | 45 |
| Sulfur | 2.5 |
| Hydrogenated resin of the type described | 5 |
| Mercaptobenzothiazole | 0.6 |
| Stearic acid | 2 |

Example 10

A natural rubber tire tread mix may be compounded as follows:

| Component: | Parts by weight |
|---|---|
| Smoked sheet rubber | 100 |
| Channel black | 40 |
| Zinc oxide | 6 |
| Hydrogenated resin of the type described | 4 |
| Sulfur | 3 |
| Stearic acid | 2 |
| Mercaptobenzothiazole | 0.7 |

Example 11

A synthetic rubber tire tread mix may be compounded as follows:

| Component: | Parts by weight |
|---|---|
| Neoprene | 100 |
| Zinc oxide | 5 |
| Mercaptobenzothiazole | 1.25 |
| Channel black | 45 |
| Hydrogenated resin of the type described | 4 |
| Phenyl-alpha-naphthylamine | 2 |
| Sulfur | 1.25 |

Example 12

| Component: | Parts by weight |
|---|---|
| Buna S | 80 |
| Plantation crepe | 20 |
| Zinc oxide | 5 |
| Channel black | 50 |
| Age Rite Resin D | 2 |
| Pine tar | 4 |
| Hydrogenated resin of the type described | 3 |
| Stearic acid | 2 |
| Sulfur | 1½ |
| Altax | 2 |

Example 13

| Component: | Parts by weight |
|---|---|
| Butadiene-styrene rubber | 100 |
| Mixture of styrene dimers and aryl styrene derivatives | 3 |
| Hydrogenated resin of the type described | 3 |
| Carbon black | 40 |
| Sulfur | 1.25 |
| Mercaptobenzothiazole | 1.25 |
| Zinc oxide | 5 |
| Phenyl-alpha-naphthylamine | 1 |

Example 14

| Component: | Parts by weight |
|---|---|
| Butadiene-acrylic nitrile rubber | 100 |
| Styrene dimer and aryl styrene derivatives | 2 |
| Hydrogenated resin of the type described | 3 |
| Carbon black | 30 |
| Sulfur | 1.5 |
| Mercaptobenzothiazole | 1.5 |
| Zinc oxide | 15 |
| Phenyl-alpha-naphthylamine | 2 |

Example 15

| Component: | Parts by weight |
|---|---|
| Butadiene-isobutylene rubber | 100 |
| Hydrocarbon oil | 5 |
| Hydrogenated resin of the type described | 5 |
| Carbon black | 15 |
| Sulfur | 1.25 |
| Mercaptobenzothiazole | 1.25 |
| Phenyl-alpha-naphthylamine | 1 |
| Zinc oxide | 20 |

Example 16

| Component: | Parts by weight |
|---|---|
| Perbunan | 100 |
| Zinc oxide | 5 |
| Benzothiazyl disulfide | 1½ |
| Sulfur | 1½ |
| Phenyl-beta-naphthylamine | 1 |
| Channel black | 50 |
| Stearic acid | 1 |
| Hydrogenated resin of the type described | 50 |

The foregoing compositions may be sheeted out, shaped and vulcanized, if desired, such as by the application of a temperature of, say, 140° C. in a press for a period of, say, 45 minutes. Other procedures may, of course, be used, if desired.

Rubber hydrogenated resin compositions of the type described either as such or with the incorporation of other ingredients may be used for a wide variety of purposes, such as for the manufure of tires, tubes, and other objects, and as adhesives, coating, impregnating, and waterproofing agents. Such compositions may or may not be vulcanized prior to, during, or subsequent to the use thereof.

To summarize, the hydrocarbon polymers or resins treated in accordance with this invention may be characterized as follows:

(1) The polymers or resins are comprised of carbon and hydrogen in chemical combination to at least 98 and more particularly, to at least 99%, other elements such as oxygen, nitrogen and/or sulfur derived from the oil pyrolyzed, if present, being restricted to less than 2%, and more particularly to less than 1%.

(2) The polymers or resins are substantially completely soluble in an excess of benzene, the proportion of insoluble material being less than 1%, and more particularly, less than 0.1% of the polymer or resin.

(3) The polymers or resins have an ash content determined by burning of less than 1%, and more particularly, of less than 0.1%.

(4) Upon subjecting the polymers or resins to destructive distillation under vacuum to effect depolymerization, that portion of the oily material recovered as overhead which boils above 200° C. has a refractivity intercept of at least 1.08 and particularly of at least 1.09 and still more particularly, of at least 1.10.

(5) Polymers or resins hardened by distilling to an overhead temperature between approximately 190 to 200° C., at 20 mm. Hg absolute pressure in accordance with the procedure of Example I have the following characteristics:

(a) They have A. S. T. M. ball and ring softening points of at least 40° C. and more particularly of at least 80° C. For example, typical polymers or resins polymerized by surface active agents such as clay, as catalysts, have A. S. T. M. ball and ring softening points of at least 40° C., such as between 60° C. and 80° C. or above, and typical polymers or resins polymerized by heat, or with acid or acid-acting catalysts, have A. S. T. M. ball and ring softening points of at least 80° C., such as between 90° and 110° C. and higher, such as up to 120° C. or above.

(b) They have densities of at least 1.10 and up to 1.20 and higher, such as between 1.13 and 1.18, as determined by the water displacement method.

(c) They have molecular weights between 300 and 1000 as determined by the freezing point depression method employing benzene as the solvent.

(d) They have a solubility in an equal quantity by weight of toluene at a temperature of 20° C. of at least 30 grams, and preferably of at least 50 grams, in 100 grams of toluene.

(e) One part of the polymers or resins when dissolved in three parts by weight of benzene having a density ($d$ 20/4) of 0.8790 and a refractivity intercept of 1.0623, makes four parts of a solution having a density greater than 0.925 and a refractivity intercept greater than 1.069. Neglecting any possible change that may occur in the solid when it is dissolved, calculated values for the polymers or resins themselves, that is, apart from the solvent (densities and refractivity intercepts being additive on a volume basis), become for densities at least 1.10, and for refractivity intercept at least 1.08 and particularly at least 1.09, and still more particularly, at least 1.10.

(6) The oils from which the polymers or resins are polymerized have mixed aniline points below 15° C., and more particularly, below 10° C., for example, between 10 and 4° C. and lower. A mixed aniline point of a given oil is defined as the critical solution temperature of a mixture of 10 cc. of anhydrous aniline, 5 cc. of the oil being tested and 5 cc. of a petroleum naphtha having an aniline point of 60° C. as determined by A. S. T. M. tentative standard D611–41T.

(7) The oils from which the polymers or resins are polymerized usually having refractivity intercepts of not less than 1.08, for example, between 1.09 and 1.11, and higher, such as, up to 1.125 or 1.135.

(8) The oils from which the polymers or resins are polymerized contain at least 90%, such as not less than 95%, and more particularly not less than 97% of aromatic hydrocarbons.

(9) The oils from which the polymers or resins are polymerized have densities of not less than 0.95, and, more particularly, of not less than 0.98 for example, between 0.99 and 1.02, and higher, such as up to 1.11 or 1.12.

(10) Liquid material extracted from the polymers or resins using a large excess of pentane has refractivity intercepts of at least 1.08 and more particularly, of at least 1.09, and still more particularly, of at least 1.10.

(11) The oil separated from the polymers or resins after polymerization usually has a density of not less than 0.95 and, more particularly, of not less than 0.98, for example, between 0.99 and 1.02 and higher, such as up to 1.11 or 1.12. Such oils separated from the polymers or resins after polymerization also usually have refractivity intercepts of not less than 1.08, for example, between 1.09 and 1.11, and higher, such as up to 1.125 or 1.135, and contain at least 90%, such as at least 95%, and more particularly, at least 97% aromatic hydrocarbons.

(12) Refractivity intercept when referred to herein is determined by the method described in the Science of Petroleum (1938), vol. 2, beginning on page 1175, and publications referred to therein.

In the claim, the term "hydrogenated resin," or its equivalent, is intended to embrace a resin of the type described herein which has been at least partially hydrogenated.

While various procedures and formulas have been particularly described these are of course subject to considerable variation. Therefore, it will be understood that the foregoing specific examples are given by way of illustration, and that changes, omissions, additions, substitutions and/or modifications might be made within the scope of the claim without departing from the spirit of the invention, which is intended to be limited only as required by the prior art.

I claim:

A composition comprising rubber-like copolymer of butadiene and styrene, and from 5% to 30% based on said copolymer of hydrogenated hydrocarbon resin produced by the hydrogenation of hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 450° C. which are not polymerizable by the application of said oil of heat alone but which are polymerizable to catalytic resin polymer by treating said oil with a resin-producing catalyst, other hydrocarbons boiling between 210° C. and 450° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 450° C.

FRANK J. SODAY.

REFERENCES CITED

The following references are of record in the file of this patent:

UNITED STATES PATENTS

| Number | Name | Date |
| --- | --- | --- |
| 2,150,641 | Thomas | Mar. 14, 1939 |
| 2,266,675 | Carmody | Dec. 16, 1941 |
| 2,266,809 | Ruben | Dec. 23, 1941 |
| 2,302,664 | Carmody | Nov. 24, 1942 |
| 2,387,237 | Ault | Oct. 23, 1945 |
| 2,387,259 | Hall et al. | Oct. 23, 1945 |

OTHER REFERENCES

Ellis, p. 112, "Hydrogenation of Organic Substances," 3rd ed., pub. 1930 by D. Van Nostrand Co., New York. (Copy in Div. 6.)